April 10, 1934. A. D. KETTENBACH ET AL  1,954,629
APPARATUS FOR AND METHOD OF HARVESTING
Filed Feb. 16, 1929   2 Sheets-Sheet 1
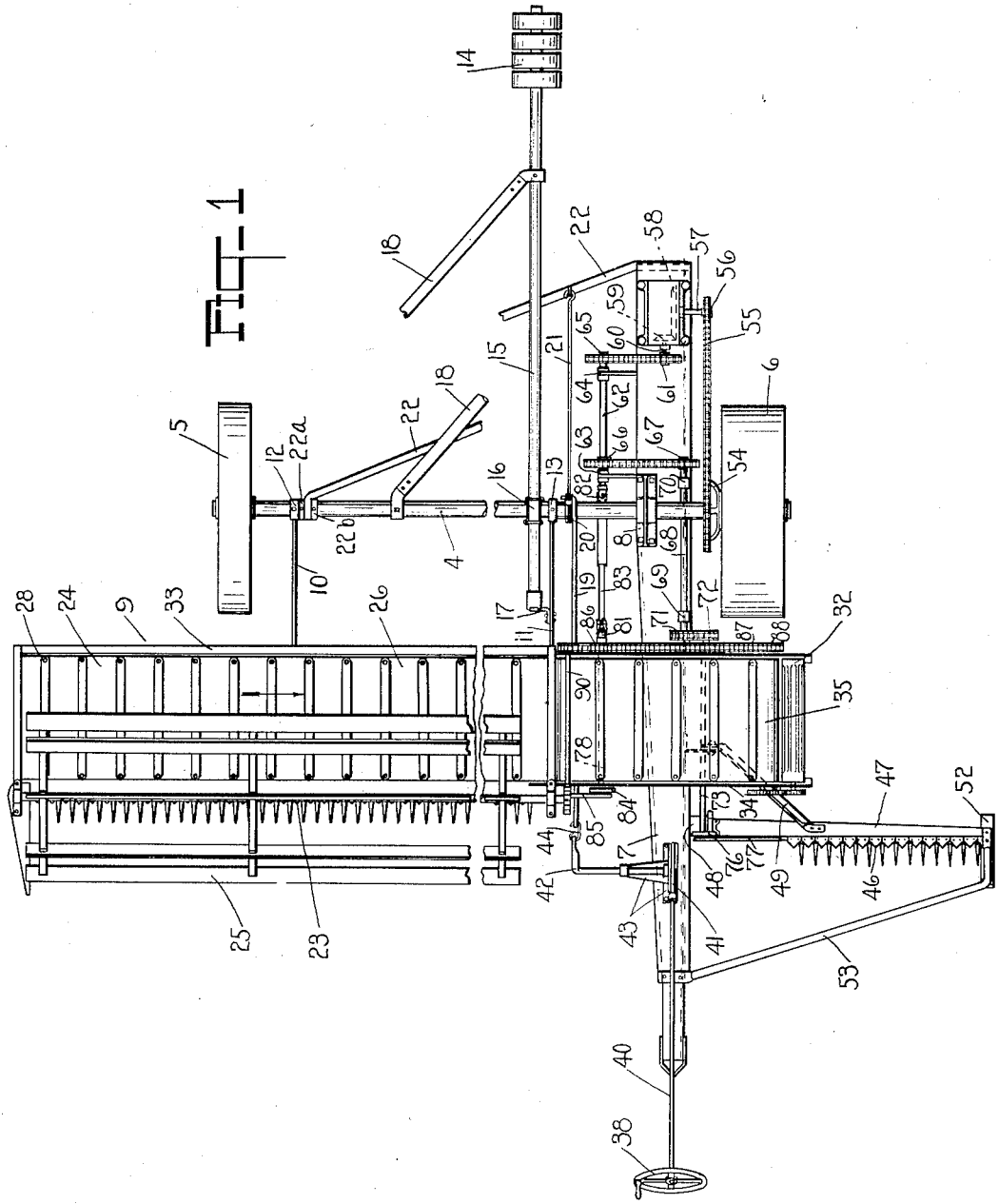
INVENTORS
Alfred D. Kettenbach
Edwin F. Huddle
BY Edward Bopf
ATTY.

April 10, 1934.  A. D. KETTENBACH ET AL  1,954,629
APPARATUS FOR AND METHOD OF HARVESTING
Filed Feb. 16, 1929    2 Sheets-Sheet 2
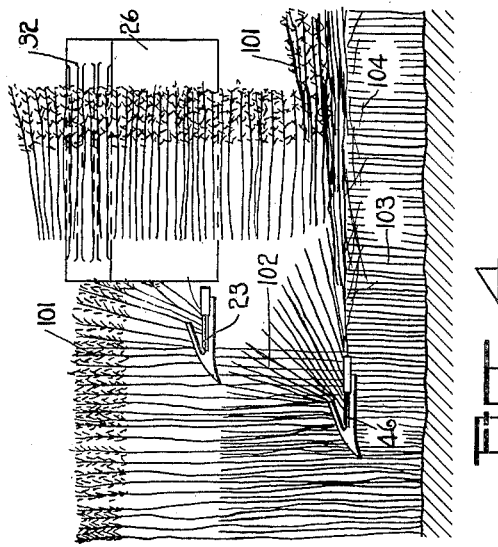
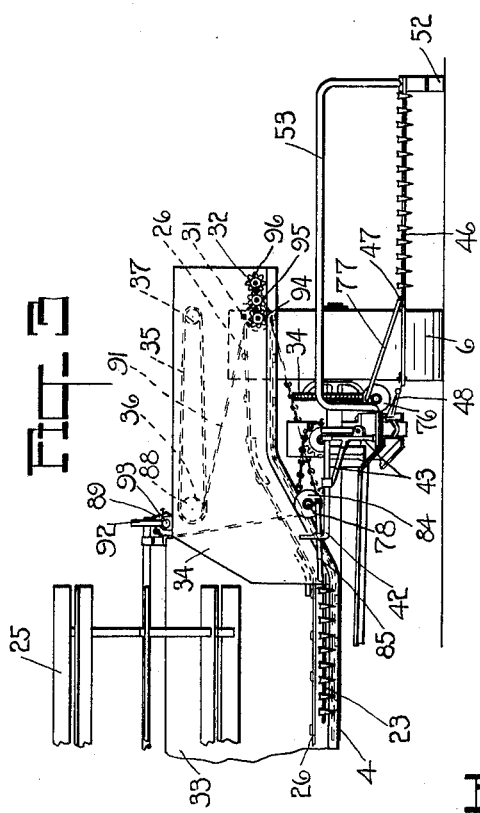
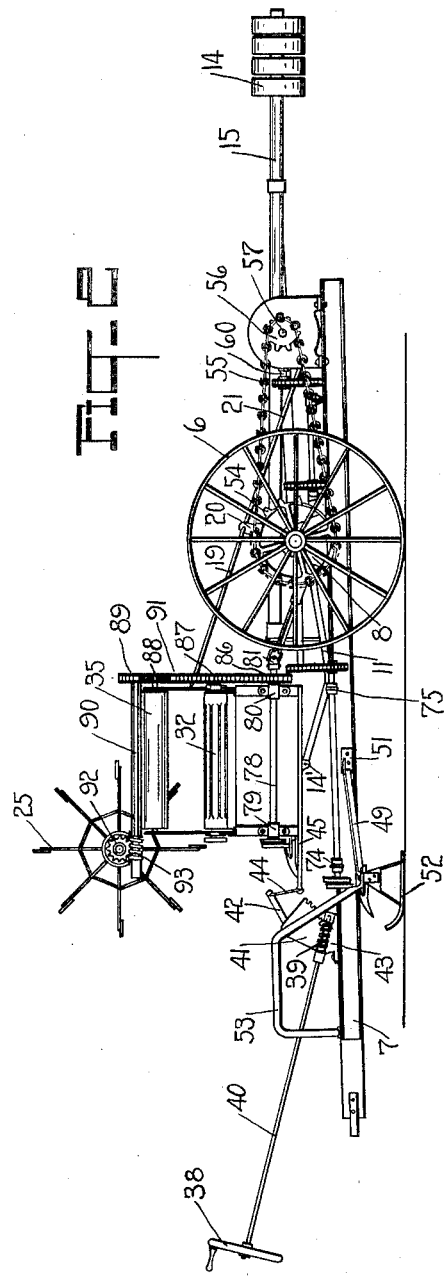

Patented Apr. 10, 1934

1,954,629

UNITED STATES PATENT OFFICE 1,954,629

APPARATUS FOR AND METHOD OF HARVESTING

Alfred D. Kettenbach, Rockyford, Alberta, Canada, and Edwin Frederick Huddle, Moline, Ill., assignors to Deere & Company, Moline, Ill., a corporation of Illinois Application February 16, 1929, Serial No. 340,494

31 Claims. (Cl. 56—23)

The subject-matter of our invention is a new and improved method of, and apparatus for, harvesting.

In certain sections of the country the practice of cutting the grain and allowing it to fall in a windrow on the field, remain there for a day or two to cure if necessary, and then drawing a thresher over the field with a pick-up attachment thereon to pick up the cut grain from the windrows, is followed. In the practice of this method, it is important that the cut grain be deposited in windrows in such a manner that it can be easily picked up by a pick-up device. Depositing the cut grain directly on the grain stubble permits some of the cut grain to fall down through the stubble onto the ground where it cannot be easily picked up and consequently may be lost.

It is usual when harvesting tall grain, to cut the grain stalks at a point a considerable distance above the ground so as not to impose an unnecessary load on the thresher when the grain is threshed by reason of its having to handle an unnecessary amount of straw. A tall stubble is rather limber, and when a windrow is deposited thereon, the weight of the windrow tends to bend the stubble over and ultimately press it down flat on the ground. The windrow in such case will not be supported above the ground so as to permit the passage of air underneath.

The object of our invention is the introduction of a new and improved method of harvesting in which one of the steps consists in preparing a bed upon which the cut grain is deposited, from which it may be easily picked up, and which is of such a nature that it will support the windrow above the ground and is such that little or none of the cut grain will fall through the stubble onto the ground. Our new method of preparing this bed consists preferably in cutting a portion of the grain stalks from which the grain has been cut at a distance above the ground to leave a relatively short but stiff stubble and allowing these stalks so cut to fall on the stubble from which they were cut and form a bed upon which the grain being cut may fall.

Another object of our invention is the provision of an improved harvester for carrying out our new method in a preferred manner. In general our improved harvester consists of a reaper equipped to cut a comparatively wide swath and deposit the grain to one side in a windrow, and equipped with an auxiliary means adapted to cut a portion of the grain stalks, from which the heads have previously been cut, directly ahead of the point where the cut grain is being deposited.

In the accompanying drawings we have illustrated a preferred embodiment of our new harvester, a description of the construction and operation of which is given in the following specification. It is to be understood, of course, that our new method may be practiced with other types of machines or combinations of machines, and that the harvester illustrated lends itself very readily to many modifications all within the scope of the invention.

In the accompanying drawings;

Figure 1 is a plan view showing a harvester embodying the principles of our invention;

Figure 2 is a side view of the harvester shown in Figure 1;

Figure 3 is a fragmentary front view of the harvester shown in Figure 1; and,

Figure 4 is a more or less diagrammatic illustration of the action of the machine in operation.

Our new harvester comprises, in general, a frame structure mounted on two wheels and adapted to be drawn by a tractor. The frame structure comprises a central axle 4 which is in the form of a rigid pipe supported on wheels 5 and 6. A rigid drawbar 7 is pivotally supported from the axle 4 by means of a bearing hanger 8 rising from the top of drawbar 7. The drawbar 7 comprises a box-like structure consisting of a top plate, a bottom plate, and two side channel beams. The axle 4 also carries the grain cutting and conveyor mechanism designated in general by the numeral 9. This mechanism is pivotally supported on brackets 10 and 11 fixed to the axle 4 at 12 and 13, respectively, and pivoted to the frame structure of the cutting and conveying mechanism 9 at their opposite ends at 14'. The weight of the cutting and conveying mechanism 9 is counterbalanced by weights 14 supported on the end of the pipe arm 15 fixed to the axle 4 at 16 and also to the support 11 by means of the bracket 17. The pipe arm 15 is braced by means of the diagonal brace 18 fixed at one end to the pipe arm 15 and at the other end to the axle 4. The fore and aft inclination of the cutting and conveying mechanism is controlled by means of the brace 19 connected to the back-side of the cutting and conveying mechanism 9 at one end and pivoted to the upper end of an arm 20 at the other end. The lower end of arm 20 embraces axle 4 and is pivotally supported thereby. It is held in fixed angular relation with respect to the drawbar 7 by means of a brace 21 connected at one end to the upper end of arm 20 and at the other end to be a diagonal brace 22. The diagonal brace 22 is fixed at one end to the back end of draw-bar 7 and at the other end it pivotally embraces the axle 4 so as to have rotary motion with respect thereto. This end is held in position by means of collars 22a and 22b fixed to the axle 4.

The cutting and conveying mechanism comprises the usual sickle 23 for cutting the grain, a conveyor 24 adapted to receive the cut grain and deposit it to one side of the machine, and a reel 25 for directing the grain against the sickle 23 and onto the conveyor.

The conveyor comprises an endless belt 26 which is disposed longitudinally and transversely directly back of the sickle 23 and extends laterally beyond the inner end of sickle 23 where it is inclined upwardly over the drawbar 7 sufficiently to clear the drawbar 7 when the conveyor is in its lowest adjusted position, from where it extends horizontally out beyond the supporting wheel 6. It is desirable not to drop the cut grain from too high a point. Dropping the grain from a relatively high point tends to mutilate the bed formed for the cut grain and force some of the grain through the stubble and onto the ground. For this reason we consider the change in the inclination of the conveyor over the drawbar back to the horizontal a feature of the design of the conveyor. Under certain circumstances it might be desirable to incline the conveyor downwardly at its delivery end to further decrease the distance of fall of the cut grain. The conveyor is adapted to receive the grain as it is cut and deliver it outside of the wheel 6 in a windrow. The belt 26 rotates on the idling roller 28 and driving roller 31. Beyond the roller 31 a third roller 32 is mounted to aid in picking the grain off of the conveyor belt 26 in the usual manner and to deposit it on the bed prepared for the cut grain, as will be described later. The third roller 32 is driven from the roller 31 through a gear train comprising gear 94 mounted on the front end of the axle of driving roller 31, idler gear 95, and gear 96 mounted on the front end of the axle of roller 32. The back of the conveying mechanism is provided with the usual wind board 33 which extends from the outer idling roller 28 to the delivery end of the conveyor at roller 32. Another wind board 34 encloses the conveyor from the inner end of the sickle 23 to the delivery end of the conveyor at roller 32. Between these two wind boards 33 and 34 and spaced above the conveyor 26 another endless belt 35 is disposed on rollers 36 and 37.

The elevation of the sickle 23 is controlled by means of a worm and gear mechanism controlled by the hand wheel 38. The worm and gear mechanism comprises a worm 39 connected to the lower end of the shaft 40 on the upper end of which the hand wheel 38 is fixed, and a gear sector 41 fixed to one end of a crank arm 42 which is pivotally supported in the brackets 43 mounted on the drawbar 7. A link 44 connects the free end of the crank arm 42 with an extension arm 45 fixed to the frame of the cutting and conveying mechanism 9. Rotating the hand wheel 38 in one or the other direction causes the conveying and cutting mechanism supported on the frame of the machine to raise or lower.

A second relatively short sickle 46 is disposed on the side of the drawbar 7 opposite that at which the regular cutting mechanism is disposed, and is positioned ahead of the point at which the grain is deposited from the grain conveyor. The sickle bar 47 upon which the sickle 46 oscillates in the usual manner is secured to the sides of the drawbar 7 by means of a bracket 48 and is braced by means of a brace 49, one end of the brace 49 being fixed to the sickle bar 47 and the other end being fixed to the bracket 51 which in turn is bolted to the side of the drawbar 7. The outer end of the sickle bar 47 is provided with a shoe 52 which is adapted to slide along the ground and hold the sickle bar 47 a fixed distance from the ground. If desired, the sickle bar 47 may be adjustably supported by the shoe 52 and the bracket 48 as by providing a series of vertically spaced bolt holes for the fastening bolts securing the sickle bar to the drawbar 7 and to the shoe 52 so that the height of the sickle bar 47 above the ground may be adjusted to suit varying conditions.

Since the position where the sickle 46 is located is not a common place for a sickle on a harvester we consider it very desirable to provide a guard 53 in the form of a pipe fastened at the forward end of the drawbar 7 from where it extends up to about the height of a man's hips and then diagonally across and down again at the end of the sickle bar 47 where the other end is fastened to the sickle bar 47.

If desired, the cutting and conveying mechanism may be driven from power derived from the tractor engine. For the sake of simplicity, however, we have elected to utilize the wheel 6 as a bull wheel for operating the cutting and conveying mechanism. The bull wheel 6 is provided with a sprocket 54 which is chain connected by means of chain 55 with a sprocket 56, which is fastened on one end of a shaft 57. The shaft 57 is mounted in a bearing fixed on the drawbar 7. A bevel gear 58 fixed to the other end of shaft 57 engages a bevel pinion 59 on a shaft 60 carrying a sprocket 61. The shaft 60 is supported in a bearing mounted on drawbar 7. A longitudinal drive shaft 62 is supported by means of bearing brackets 63 and 64 from the inner side of the drawbar 7. A sprocket 65 fixed on the drive shaft 62 is chain connected with the sprocket 61. A sprocket 66 fixed on the shaft 62 is chain connected with a sprocket 67 fixed on an auxiliary drive shaft 68 supported in bearings 69 and 70 mounted on the drawbar 7. A sprocket 71 on shaft 68 is chain connected to a sprocket 72 fixed on a crank shaft 73 supported by means of bearings 74 and 75 fixed to the side of drawbar 7. A flywheel 76 is fixed on the opposite end of the crank shaft 73. A pitman 77, connected accentrically with the flywheel 76 at one end and with the sickle 46 at the other, transmits oscillatory motion to the sickle 46 to operate the same.

A crank shaft 78 is mounted in bearing supports 79 and 80 supported from the under-side of the conveying mechanism frame. This shaft has driving connection at one end with the drive shaft 62 through two universal joints 81 and 82 and a telescopic connection 83. A flywheel 84 is fastened to the other end of the crank shaft 78, and a pitman 85 is eccentrically connected thereto at one end and to the sickle 23 at the other end, for transmitting oscillatory motion to the sickle 23.

A sprocket 86 for driving the conveyor mechanism and the reel is mounted on the shaft 78 between the universal joint 81 and the bearing 80. A sprocket 87 is fixed to the shaft of roller 31 for driving the conveyor belt 26; a sprocket 88 is fixed to the shaft of roller 36 for driving the endless belt 35; and a sprocket 89 is fixed to the reel driving shaft 90 for driving the reel. The shaft 90 is conveniently supported in bearings mounted on the top of the wind boards 33 and 34. An endless chain 91 connects sprocket 86 with sprockets 87, 88 and 89 for driving the same. The reel 25 is supported in the usual manner above the sickle 23 and is provided with a gear 92 at one end of its shaft which gear engages a worm 93 fixed to the front end of the shaft 90.

In the operation of the machine, the sickle 23 is adjusted to a height sufficient to completely cut the heads from the shortest grain stalks. The sickle 46 upon the second round will cut a relatively narrow path in the remaining stalks about six inches or a foot above the ground, which stalks upon falling on the short stubble from which such stalks were cut will provide a more or less smooth bed upon which the cut grain may fall. As a result a stubble remains which is sufficiently rigid to support the weight of the windrow deposited thereon and the cut grain is prevented from falling down between the stubble onto the ground where it is difficult or impossible to pick it up with a pick-up device. Figure 4 illustrates, more or less diagrammatically, the results obtained in the operation of this machine. The sickle 23 cuts the heads 101 of the grain while the sickle 46 cuts a portion of the remaining stalks 102 to within about six inches or a foot above the ground leaving the short stiff stubble 103 upon which the stalks 102 fall to form the bed 104. The cut grain heads 101 are conveyed by the conveyor 26 and dropped over the end of the roller 32 onto the bed where they can be easily picked up by any of the well known and approved pick-up devices.

Another feature inherent to this method of harvesting grain is that by depositing the grain in a windrow in what might be called a trough, formed by cutting a path in the grain stalks, in which the grain is deposited, the standing stalks on both sides of the windrow very effectively protect the grain from the wind and thus prevent the grain from being blown out of the windrow where it will become lost.

While we have illustrated a machine in which the auxiliary sickle, for cutting the grain stalks and forming the bed upon which the cut grain is deposited, is positioned on the side of the drawbar opposite to which the regular grain cutting mechanism is positioned, as a preferred embodiment of our invention, we do not wish to be limited to this precise arrangement. It is also within the contemplation of our invention to mount this auxiliary sickle either back of the cutting and conveying mechanism in the vicinity of wheel 5, either in back or in front thereof, or directly under the main grain cutting sickle in a position where it will form a bed upon which the grain will fall on the next round, or on the same round when using a central delivery reaper. If desired, this method may be practiced by using a separate mower for cutting the stalks and forming the bed, drawn by another tractor, or other independent draft means.

What is considered new and desired to have protected by Letters Patent is set forth in the appended claims.

What is claimed is:—

1. The method of harvesting grain which consists in cutting the heads from the grain stalks and depositing them in the form of a windrow upon a bed formed of cut grain stalks from which the heads have been cut resting on the stubble.

2. The method of harvesting grain which consists in cutting the heads from the stalks, cutting a portion of the stalks from which the grain has been cut and allowing it to fall on the stubble, and depositing the grain heads in the form of a windrow on the cut grain stalks.

3. The method of harvesting grain which consists in cutting the grain heads from the stalks, simultaneously cutting a trough out of the standing stalks by cutting an additional portion of the stalks and allowing the cut portion of the stalks to fall on the stubble in the bottom of the trough, and depositing the cut grain heads in the trough.

4. A harvesting machine comprising a cutting mechanism for cutting the grain and conveyor mechanism for conveying the grain laterally to one side of the cutting mechanism, and auxiliary cutting mechanism directly in advance of the point where the cut grain heads are deposited for cutting a portion of the grain stalks from which the grain heads have previously been cut.

5. In a harvesting machine comprising means for cutting grain and for depositing it in a windrow, means in advance of the point where the grain being cut is being deposited for cutting the grain stalks from which the grain has been cut.

6. A harvesting machine comprising a wheel supported frame, a drawbar for said frame, a grain cutting mechanism at one side of said drawbar, a conveyor for conveying cut grain from said cutting mechanism and for depositing it at the opposite side of said drawbar, and a second cutting mechanism on said opposite side of said drawbar for cutting the grain stalks in advance of the point where the cut grain is deposited.

7. A harvesting machine comprising a wheel supported frame, a drawbar for said frame, a grain cutting mechanism at one side of said drawbar, a conveyor for conveying cut grain from said cutting mechanism and for depositing it at the opposite side of said drawbar, and means supported on said opposite side of said drawbar for acting on the grain stalks from which the grain has been cut for forming a bed upon which the grain being cut is being deposited.

8. A harvesting machine comprising a wheel supported frame having a wheel axle, a drawbar pivotally supported on said axle for vertical movement relative thereto, a grain cutting mechanism carried on said frame, and a second cutting mechanism carried on said drawbar.

9. A harvesting machine comprising a wheel supported frame having a wheel axle, a drawbar pivotally supported on said axle for vertical movement relative thereto, a grain cutting mechanism carried on said frame, a second cutting mechanism carried on said drawbar, and a drive shaft mounted on said drawbar for operating both said cutting mechanisms.

10. A harvesting machine comprising a wheel supported frame having a wheel axle, a drawbar pivotally supported on said axle for vertical movement relative thereto, a grain cutting mechanism carried on said frame, a second cutting mechanism carried on said drawbar, and mechanism on said drawbar for rotating said frame about said axle relative to said drawbar to change the relative difference in cutting heights of said cutting mechanisms.

11. A harvesting machine comprising a wheel supported frame having a wheel axle, a drawbar pivotally supported on said axle for vertical movement relative thereto, a grain cutting mechanism carried on said frame, and a second cutting mechanism carried on said drawbar, and a guard comprising a rigid bar fixed to said drawbar in advance of said second cutting mechanism and inclined rearwardly and outwardly, and fixed to the outer end of said second cutting mechanism.

12. The method of harvesting grain which consists in cutting the heads from the grain stalks, collecting the cut grain at a delivery point, cutting a portion of the stalks from which the grain has been cut at the delivery point, and depositing the collected grain in the form of a windrow on the cut grain stalks.

13. A harvesting machine comprising a cutting apparatus for cutting the heads of grain from the grain stalks, a conveyor for delivering the cut grain to a point of delivery, a second cutting apparatus in advance of the delivery point for cutting a portion of the grain stalks to form a bed for receiving the cut grain.

14. A harvesting machine comprising a cutting apparatus for cutting the heads of grain from the grain stalks, a second cutting apparatus for cutting a portion of the stalks from which the grain heads have been cut to form a trough, and a conveyor for collecting the cut grain heads and delivering them into said trough in rear of said second cutting apparatus.

15. A harvesting machine comprising a cutting mechanism for cutting grain stalks at one level, conveyor mechanism for conveying laterally to a point of delivery the grain heads severed by said cutting mechanism, and a second cutting mechanism positioned directly in advance of the point of delivery for cutting grain stalks at a lower level than that at which said first cutting mechanism is operated.

16. A harvesting machine comprising a cutting mechanism for cutting grain stalks at one level, conveyor mechanism for conveying laterally to a point of delivery the grain heads severed by said cutting mechanism, a second cutting mechanism positioned directly in advance of the point of delivery for cutting grain stalks at a lower level than that at which said first cutting mechanism is operated, and means for adjusting the level at which the first cutting mechanism is operated.

17. A wheel supported harvesting machine comprising a frame and a grain cutting mechanism pivotally connected for relative pivotal movement about a transverse horizontal axis whereby said cutting mechanism may be raised and lowered relative to said frame, a second cutting mechanism supported by said frame, and means for collecting grain cut by said first cutting mechanism in the operation of the machine and for conveying it to a point directly back of said second cutting mechanism.

18. A wheel supported harvesting machine comprising a frame and a grain cutting mechanism pivotally connected for relative pivotal movement about a transverse horizontal axis whereby said cutting mechanism may be raised and lowered relative to said frame, a second cutting mechanism supported on one end by said frame, a shoe adapted to run on the ground supporting the opposite end of said second cutting mechanism, and means for collecting grain cut by said first cutting mechanism in the operation of the machine and for conveying it to a point directly back of said second cutting mechanism.

19. In combination with a harvesting machine comprising means for collecting grain and conveying it to a point of delivery, of cutting means for cutting grain stalks directly in advance of the point of delivery, whereby the grain being deposited at the delivery point is delivered onto the stubble left back of said cutting means.

20. In a harvesting machine comprising a wheel supported frame, a main cutting mechanism including a sickle positioned transversely of the frame, a conveyor disposed back of the sickle for collecting grain cut by the sickle and conveying it to a point of delivery where the cut grain is deposited in the form of a windrow, auxiliary cutting mechanism comprising a sickle disposed transversely of the frame and in a vertical plane a slight distance in advance of the vertical plane of the sickle of the main cutting mechanism, and means for operating said sickles simultaneously with the forward advance of the machine.

21. In a harvesting machine comprising a wheel supported frame, a main cutting mechanism including a sickle positioned transversely of the frame, a conveyor disposed back of the sickle for collecting grain cut by the sickle and conveying it to a point of delivery where the cut grain is deposited in the form of a windrow, auxiliary cutting mechanism comprising a sickle disposed transversely of the frame a slight distance in advance of and at a lower level than the sickle of the main cutting mechanism, and means for operating said sickles simultaneously with the forward advance of the machine'

22. The method of harvesting grain which consists in cutting the grain stalks to sever the grain heads therefrom, forming a trough by cutting some of the grain stalks at a lower level and allowing the upper portion of the stalks cut in the formation of the trough to fall on the stubble in the trough, and depositing the severed grain heads in the trough.

23. The method of harvesting grain which consists in cutting the grain stalks to sever the grain heads therefrom, forming a trough by cutting some of the grain stalks at a lower level and allowing the upper portion of the stalks cut in the formation of the trough to fall in the trough, and simultaneously depositing the severed grain heads in the trough.

24. A wheel supported harvesting machine comprising a frame and a grain cutting mechanism pivotally connected for relative pivotal movement about a transverse horizontal axis whereby said cutting mechanism may be raised and lowered relative to said frame, a second cutting mechanism supported by said frame and positioned to cut a relatively short stubble, and means for collecting grain cut by said first cutting mechanism in the operation of the machine and for delivering it on the stubble at a point directly back of said second cutting mechanism.

25. A wheel supported harvesting machine comprising a frame, two grain cutting mechanisms supported by said frame, means for raising and lowering one of said cutting mechanisms relative to the other, and means for collecting grain cut by one of said cutting mechanisms in the operation of the machine and for conveying it to a point directly back of the other cutting mechanism.

26. A wheel supported harvesting machine comprising a frame and a grain cutting mechanism pivotally connected for relative pivotal movement about a transverse horizontal axis, a second cutting mechanism supported on one end by said frame, means for raising and lowering said first cutting mechanism relative to said frame and to said second cutting mechanism, a shoe adapted to run on the ground supporting the opposite end of said second cutting mechanism, and means for collecting grain cut by said first cutting mechanism in the operation of the machine and for conveying it to a point directly back of said second cutting mechanism.

27. In a harvesting machine, the combination with means for cutting grain and conveying means for conveying the cut grain laterally and depositing it on the ground to one side of said cutting means, of cutting means for cutting the grain stalks from which the grain has been cut directly in advance of the point where the grain being cut is being deposited.

28. The method of harvesting grain which consists in simultaneously cutting swaths at different levels to form a swath of shorter stubble alongside a swath of longer stubble, and depositing the longer and shorter severed portions of the stalks in the form of a windrow along the swath of shorter stubble.

29. A harvesting machine comprising a pair of cutters for cutting swaths at different levels to form a swath of shorter stubble alongside a swath of longer stubble, and means for collecting and conveying the grain cut by the cutter leaving the longer stubble and for depositing it back of the other cutter in the form of a windrow along the swath of shorter stubble.

30. In combination with a harvesting machine comprising means for cutting and collecting grain and conveying it to a point of delivery, of auxiliary cutting means for cutting grain stalks directly in advance of the point of delivery, whereby the grain being deposited at the delivery point is delivered onto the stubble left back of said auxiliary cutting means.

31. A windrow harvesting machine comprising means for cutting the head portions from grain stalks including means for cutting some of the grain stalks into a head portion and a straw portion, the cut straw portions being deposited upon the stubble to form a bed, and means for collecting the head portions and depositing the latter upon the bed of cut straw portions.

ALFRED D. KETTENBACH.
EDWIN FREDERICK HUDDLE.